(12) United States Patent
Funaki

(10) Patent No.: US 12,411,471 B2
(45) Date of Patent: Sep. 9, 2025

(54) CUTTING TOOL, TOOL SYSTEM AND COMMUNICATION CONTROL METHOD

(71) Applicant: Sumitomo Electric Industries, Ltd., Osaka (JP)

(72) Inventor: Masataka Funaki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 342 days.

(21) Appl. No.: 18/008,456

(22) PCT Filed: May 18, 2021

(86) PCT No.: PCT/JP2021/018760
§ 371 (c)(1),
(2) Date: Dec. 6, 2022

(87) PCT Pub. No.: WO2021/251072
PCT Pub. Date: Dec. 16, 2021

(65) Prior Publication Data
US 2023/0205166 A1 Jun. 29, 2023

(30) Foreign Application Priority Data
Jun. 8, 2020 (JP) ................................ 2020-099186

(51) Int. Cl.
*G05B 19/402* (2006.01)
*B23B 27/16* (2006.01)

(52) U.S. Cl.
CPC ............ *G05B 19/402* (2013.01); *B23B 27/16* (2013.01); *B23B 2270/32* (2013.01);
(Continued)

(58) Field of Classification Search
CPC .......... B32B 2260/128; B32B 2270/32; B32B 2270/48; B32B 27/14; B32B 27/16; B32B 29/323; B23Q 17/0966; B23Q 17/0971; B23Q 17/0985; G05B 19/402; G05B 19/4065; G05B 2219/33192; G05B 2219/37027; G05B 2219/37236; G05B 2219/37274; G05B 2219/37337;
(Continued)

(56) References Cited

U.S. PATENT DOCUMENTS

| 4,927,300 A | 5/1990 | Ramalingam et al. |
| 2002/0067968 A1* | 6/2002 | Lapikas ............... B23Q 16/001 269/317 |

(Continued)

FOREIGN PATENT DOCUMENTS

| DE | 102007036002 A1 | 2/2009 |
| JP | 57-079431 A | 5/1982 |

(Continued)

*Primary Examiner* — Kidest Bahta
(74) *Attorney, Agent, or Firm* — XSENSUS LLP

(57) ABSTRACT

A cutting tool for turning includes a cutting insert having a cutting edge, a holder for holding the cutting insert, a wireless communication unit for transmitting information based on a measurement result of a sensor attached to the cutting tool, an acceleration sensor installed in the holder, and a control unit for performing first control for controlling activation of the wireless communication unit based on the measurement result of the acceleration sensor.

8 Claims, 9 Drawing Sheets

(52) U.S. Cl.
CPC ............... *B23B 2270/48* (2013.01); *G05B 2219/33192* (2013.01); *G05B 2219/37027* (2013.01); *G05B 2219/37236* (2013.01); *G05B 2219/37388* (2013.01)

(58) Field of Classification Search
CPC .......... G05B 2219/37388; G05B 2219/37428; G05B 2219/50009
See application file for complete search history.

(56) References Cited

U.S. PATENT DOCUMENTS

| | | | | |
|---|---|---|---|---|
| 2006/0085092 | A1* | 4/2006 | Redecker | B23Q 17/098 700/174 |
| 2009/0234490 | A1* | 9/2009 | Suprock | B23B 31/02 408/116 |
| 2011/0305534 | A1* | 12/2011 | Park | B23B 51/02 407/100 |
| 2015/0027723 | A1* | 1/2015 | Fripp | G01V 11/002 166/373 |
| 2015/0122098 | A1* | 5/2015 | Scherhag | B26D 5/00 83/367 |
| 2018/0311779 | A1* | 11/2018 | Ziegltrum | B23Q 17/0985 |
| 2019/0001456 | A1* | 1/2019 | Kalhori | B23Q 17/0952 |
| 2019/0232377 | A1* | 8/2019 | Ostling | B23Q 17/2233 |
| 2020/0156200 | A1* | 5/2020 | Nakaya | G05B 19/19 |
| 2021/0100417 | A1 | 4/2021 | Tauber et al. | |

FOREIGN PATENT DOCUMENTS

| | | | |
|---|---|---|---|
| JP | 61-013242 | Y2 | 4/1986 |
| JP | 2-503171 | A | 10/1990 |
| JP | 2018-043339 | A | 3/2018 |
| JP | 2018-054611 | A | 4/2018 |
| JP | 2018-103286 | A | 7/2018 |
| JP | 2020-062746 | A | 4/2020 |
| WO | 2018/177623 | A1 | 10/2018 |
| WO | 2019/130659 | A1 | 7/2019 |

\* cited by examiner

| Position | Measurement Result of Acceleration Sensor | Wireless Communication Unit | Acceleration Sensor | Measurement Sensor |
|---|---|---|---|---|
| 1 | other than 1G | Non-Reporting State | Always Driven | Non-Measurement State |
| 2 | 1G | Reporting State | Always Driven | Measurement State |

| Position | Measurement Result of Acceleration Sensor (X,Y) | Wireless Communication Unit | Acceleration Sensor | Measurement Sensor |
|---|---|---|---|---|
| Machining Position | (0G, 1G) | Reporting State | Always Driven | Measurement State |
| Preparation Position | (0.5G, 0.5G) (-1G, 0) | Reporting State | Always Driven | Non-Measurement State |
| Stop Position | (1G, 0) (0.5G, 0.5) | Non-Reporting State | Always Driven | Non-Measurement State |

FIG. 8

State of Each Cutting Tool in Step 1

| Cutting Tool | Measurement Result of Acceleration Sensor (X,Y) | Position | Wireless Communication Unit | Acceleration Sensor | Measurement Sensor |
|---|---|---|---|---|---|
| 100A | (0G, 1G) | Machining Position | Reporting State | Always Driven | Measurement State |
| 100B | (0.5G, 0.5G) | Preparation Position | Reporting State | Always Driven | Non-Measurement State |
| 100C | (1G, 0G) | Stop Position | Non-Reporting State | Always Driven | Non-Measurement State |

FIG. 9

State of Each Cutting Tool in Step 2

| Cutting Tool | Measurement Result of Acceleration Sensor (X,Y) | Position | Wireless Communication Unit | Acceleration Sensor | Measurement Sensor |
|---|---|---|---|---|---|
| 100A | (-0.5G, 0.5G) | Stop Position | Non-Reporting State | Always Driven | Non-Measurement State |
| 100B | (0G, 1G) | Machining Position | Reporting State | Always Driven | Measurement State |
| 100C | (0.5G, 0.5G) | Preparation Position | Reporting State | Always Driven | Non-Measurement State |

FIG. 10

State of Each Cutting Tool in Step 3

| Cutting Tool | Measurement Result of Acceleration Sensor (X,Y) | Position | Wireless Communication Unit | Acceleration Sensor | Measurement Sensor |
|---|---|---|---|---|---|
| 100A | (-1G, 0G) | Preparation Position | Reporting State | Always Driven | Non-Measurement State |
| 100B | (-0.5G, 0.5G) | Stop Position | Non-Reporting State | Always Driven | Non-Measurement State |
| 100C | (0G, 1G) | Machining Position | Reporting State | Always Driven | Measurement State |

CUTTING TOOL, TOOL SYSTEM AND COMMUNICATION CONTROL METHOD

CROSS-REFERENCE TO RELATED APPLICATIONS

The present application is based on PCT/JP2021/018760, filed on May 18, 2021, which claims priority to JP 2020-099186, filed Jun. 8, 2020, the entire contents of each are incorporated herein by reference.

TECHNICAL FIELD

The present disclosure relates to a cutting tool, a tool system and a communication control method.

BACKGROUND ART

PTL 1 (Japanese Unexamined Patent Application Publication No. 2018-43339) discloses a cutting head provided with a current path as described below. That is, the cutting head with a current path is a cutting tool for cutting an object or a holder for holding the cutting tool, and a current path for measuring a change in a member of the cutting tool or the holder is directly or indirectly formed in the whole or a part of the member of the cutting tool or the holder.

PRIOR ART DOCUMENT

Patent Literature

PTL 1: Japanese Unexamined Patent Application Publication No. 2018-43339

SUMMARY OF INVENTION

A cutting tool of the present disclosure is a cutting tool for turning including a cutting insert having a cutting edge, a holder to hold the cutting insert, a wireless communication unit configured to transmit information based on a measurement result of a sensor attached to the cutting tool, an acceleration sensor disposed at the holder, and a control unit configured to perform first control of controlling activation of the wireless communication unit, based on a measurement result of the acceleration sensor.

A tool system of the present disclosure includes a first cutting tool for turning, and a second cutting tool for turning. Each of the first cutting tool and the second cutting tool includes a cutting insert having a cutting edge, a holder to hold the cutting insert, a wireless communication unit configured to transmit measurement information based on a measurement result of a sensor attached to a corresponding cutting tool among the first cutting tool and the second cutting tool, an acceleration sensor disposed at the holder, and a control unit configured to perform activation control of controlling activation of the wireless communication unit, based on a measurement result of the acceleration sensor. The control unit of the first cutting tool and the control unit of the second cutting tool are configured to perform the activation control at a timing of a change in the positions of the first cutting tool and the second cutting tool with respect to a workpiece, details of the activation control performed by the control unit of the first cutting tool and details of the activation control performed by the control unit of the second cutting tool being different from each other.

A communication control method of the present disclosure is a communication control method in a tool system including a first cutting tool for turning and a second cutting tool for turning, each of the first cutting tool and the second cutting tool including a cutting insert having a cutting edge, a holder to hold the cutting insert, a wireless communication unit configured to transmit information based on a measurement result of a sensor attached to a corresponding cutting tool among the first cutting tool and the second cutting tool, an acceleration sensor disposed at the holder, and a control unit configured to perform activation control of controlling activation of the wireless communication unit, based on a measurement result of the acceleration sensor, the communication control method includes acquiring, by the control unit of the first cutting tool, the measurement result of the corresponding acceleration sensor, acquiring, by the control unit of the second cutting tool, the measurement result of the corresponding acceleration sensor and performing, by the control unit of the first cutting tool and the control unit of the second cutting tool, the activation control, details of the activation control performed by the control unit of the first cutting tool and details of the activation control performed by the control unit of the second cutting tool being different from each other.

An aspect of the present disclosure can be implemented as a semiconductor integrated circuit that implements a part or all of a cutting tool. In addition, one aspect of the present disclosure can be realized as a semiconductor integrated circuit that realizes a part or all of the tool system. Further, one aspect of the present disclosure can be realized as a program for causing a computer to execute the steps of the processing in the communication control method.

BRIEF DESCRIPTION OF DRAWINGS

FIG. 8 is a diagram for explaining the details of the first activation control and the second activation control by the control unit in each cutting tool in step 1 shown in FIG. 6.

FIG. 9 is a diagram for explaining the details of the first activation control and the second activation control by the control unit in each cutting tool in step 2 shown in FIG. 6.

FIG. 10 is a diagram for explaining the details of the first activation control and the second activation control by the control unit in each cutting tool in step 3 shown in FIG. 6.

DESCRIPTION OF EMBODIMENTS

Figure 1:
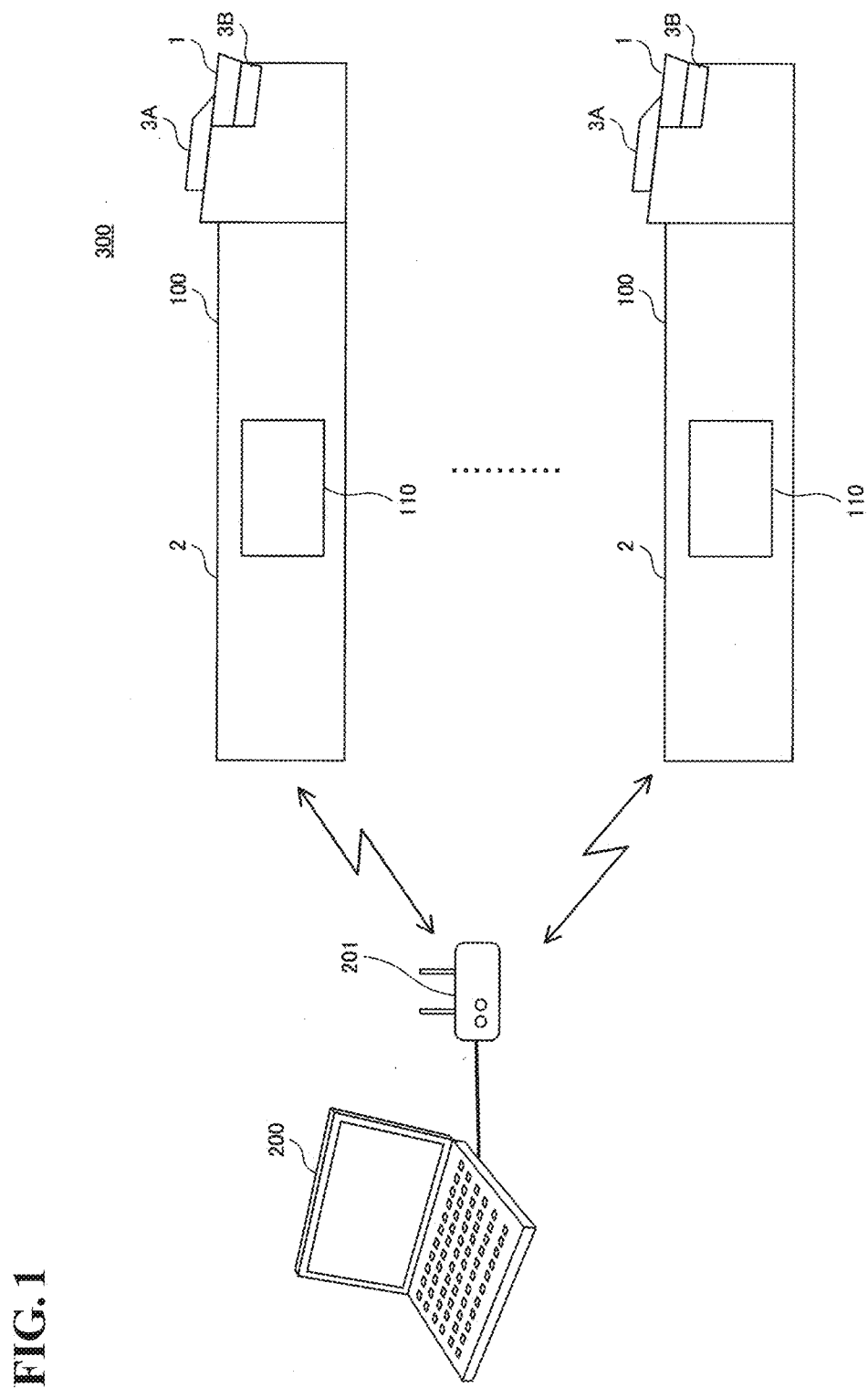
FIG. 1 is a diagram showing a configuration of a tool system according to an embodiment of the present disclosure.

Conventionally, a technique for monitoring a state of a cutting tool is known.

Problems to be Solved by Present Disclosure

There is a demand for a technique capable of realizing more excellent functions in a system capable of monitoring the state of a cutting tool beyond the technique described in PTL 1.

The present disclosure has been made to solve the above-described problems, and an object thereof is to provide a cutting tool, a tool system, and a communication control method capable of realizing more excellent functions in a system capable of monitoring a state of a cutting tool.

Advantageous Effects of Present Disclosure

According to the present disclosure, a better function can be realized in a system capable of monitoring the state of a cutting tool.

Description of Embodiments of Present Disclosure

First, the contents of the embodiments of the present disclosure will be listed and explained.

(1) A cutting tool according to an embodiment of the present disclosure is a cutting tool for turning including a cutting insert having a cutting edge, a holder to hold the cutting insert, a wireless communication unit configured to transmit information based on a measurement result of a sensor attached to the cutting tool, an acceleration sensor disposed at the holder, and a control unit configured to perform first control of controlling activation of the wireless communication unit, based on a measurement result of the acceleration sensor.

For example, in order to suppress consumption of electric power necessary for wireless transmission of information based on a measurement result (hereinafter, also referred to as "measurement information"), a technique of activating a wireless communication unit at a timing of starting machining is desired. On the other hand, in order to control the activation of the wireless communication unit at the timing of starting the machining, an input operation by an operator, installation of an external device for detecting the timing of starting the machining, or the like is required.

In contrast, with the above-described configuration, the state of the cutting tool can be determined using the acceleration sensor mounted on the cutting tool. Accordingly, since it is possible to grasp the timing suitable for activation of the wireless communication unit in the cutting tool, it is possible to perform activation of the wireless communication unit at an appropriate timing without requiring an input operation by an operator or installation of an external device.

In addition, by performing activation of the wireless communication unit at an appropriate timing, it is possible to suppress consumption of power necessary for wireless transmission of measurement information and to suppress an increase in wireless traffic. Therefore, it is possible to realize more excellent functions in the system capable of monitoring the state of the cutting tool.

(2) The cutting tool may be configured to include a plurality of acceleration sensors each being the acceleration sensor and each configured to measure an acceleration in a single direction, or a single acceleration sensor being the acceleration sensor and configured to measure accelerations in a plurality of directions.

For example, in a system in which a cutting tool is attached to a turret of machining equipment and the cutting tool used for machining is automatically replaced by rotating the turret for each machining process, gravitational acceleration in the vertical direction that the cutting tool experiences has the same value at two locations that are line-symmetric with respect to a straight line passing through the center of the turret and extending in the vertical direction.

In contrast, with the configuration as described above, it is possible to measure gravitational acceleration in a plurality of directions, and thus it is possible to more accurately determine the position of the cutting tool and to perform activation of the wireless communication unit at a more appropriate timing.

(3) The control unit may be configured to determine a position of the cutting tool with respect to a workpiece, and perform the first control of which details correspond to the determined position.

With such a configuration, for example, since the timing at which the cutting tool reaches the machining position can be grasped, the activation of the wireless communication unit in the cutting tool can be performed at a more appropriate timing.

(4) The position may include a machining position in which machining with the cutting tool is performed, a stop position in which machining with the cutting tool is not performed, and a preparation position between the machining position and the stop position. The control unit may be configured to activate the wireless communication unit as the first control in a case where the cutting tool is in the preparation position with respect to the workpiece.

With such a configuration, before starting machining by the cutting tool, it is possible to secure a time for establishing a communication connection between the cutting tool and the management device that is a transmission destination of the measurement information. Therefore, it is possible for the management device to more reliably acquire the measurement information at the timing of starting the machining.

(5) The cutting tool may further include a measurement sensor of a type different from the acceleration sensor. The wireless communication unit may be configured to transmit information based on a measurement result of the measurement sensor. The control unit may be configured to further perform second control of controlling activation of the measurement sensor, based on the measurement result of the acceleration sensor.

In this manner, by performing the second control in addition to the first control, the power consumption can be further suppressed.

(6) A tool system according to an embodiment of the present disclosure includes a first cutting tool for turning, and a second cutting tool for turning. Each of the first cutting tool and the second cutting tool includes a cutting insert having a cutting edge, a holder to hold the cutting insert, a wireless communication unit configured to transmit measurement information based on a measurement result of a sensor attached to a corresponding cutting tool among the first cutting tool and the second cutting tool, an acceleration sensor disposed at the holder, and a control unit configured to perform activation control of controlling activation of the wireless communication unit, based on a measurement result of the acceleration sensor. The control unit of the first cutting tool and the control unit of the second cutting tool are configured to perform the activation control at a timing of a change in the positions of the first cutting tool and the second cutting tool with respect to a workpiece, details of the activation control performed by the control unit of the first cutting tool and details of the activation control performed by the control unit of the second cutting tool being different from each other.

For example, in order to suppress consumption of power necessary for wireless transmission of measurement information, a technique of activating a wireless communication unit at a timing of starting machining is desired. On the other hand, in order to control the activation of the wireless communication unit at the timing of starting the machining, an input operation by an operator, installation of an external device for detecting the timing of starting the machining, or the like is required.

In contrast, with the above-described configuration, the state of the cutting tool can be determined using the acceleration sensor mounted on the cutting tool. Accordingly, since it is possible to grasp the timing suitable for activation of the wireless communication unit in the cutting tool, it is possible to perform activation of the wireless communication unit at an appropriate timing without requiring an input operation by an operator or installation of an external device.

In addition, by performing activation of the wireless communication unit at an appropriate timing, it is possible to suppress consumption of power necessary for wireless transmission of measurement information and to suppress an increase in wireless traffic particularly effectively in a tool system including a plurality of cutting tools.

Further, according to the above-described configuration, for example, at the timing at which machining is performed by the first cutting tool, the wireless communication unit in the first cutting tool can be activated, and the wireless communication unit in the second cutting tool can be stopped. That is, the control unit in each cutting tool can perform the first control with appropriate details according to the state of each cutting tool. Therefore, it is possible to realize more excellent functions in the system capable of monitoring the state of the cutting tool.

(7) The tool system may further include a management device. The control unit may be configured to determine a position of the first cutting tool or the second cutting tool with respect to the workpiece and create position information indicating a determined result. The wireless communication unit may be configured to transmit the measurement information including the position information created by the control unit. The management device may be configured to display details based on the position information included in the measurement information received from the wireless communication unit.

With such a configuration, in the management device, since the position of each cutting tool can be further grasped in addition to the measurement result of the sensor, it is possible to easily confirm whether or not the measurement of the sensor in the cutting tool during machining is appropriately performed.

(8) A communication control method according to an embodiment of the present disclosure is a communication control method in a tool system including a first cutting tool for turning and a second cutting tool for turning, each of the first cutting tool and the second cutting tool including a cutting insert having a cutting edge, a holder to hold the cutting insert, a wireless communication unit configured to transmit information based on a measurement result of a sensor attached to a corresponding cutting tool among the first cutting tool and the second cutting tool, an acceleration sensor disposed at the holder, and a control unit configured to perform activation control of controlling activation of the wireless communication unit, based on a measurement result of the acceleration sensor. The communication control method includes, acquiring, by the control unit of the first cutting tool, the measurement result of the corresponding acceleration sensor, acquiring, by the control unit of the second cutting tool, the measurement result of the corresponding acceleration sensor, and performing, by the control unit of the first cutting tool and the control unit of the second cutting tool, the activation control, details of the activation control performed by the control unit of the first cutting tool and details of the activation control performed by the control unit of the second cutting tool being different from each other.

For example, in order to suppress consumption of power necessary for wireless transmission of measurement information, a technique of activating a wireless communication unit at a timing of starting machining is desired. On the other hand, in order to control the activation of the wireless communication unit at the timing of starting the machining, an input operation by an operator, installation of an external device for detecting the timing of starting the machining, or the like is required.

In contrast, the state of the cutting tool can be determined using an acceleration sensor mounted on the cutting tool. Accordingly, since it is possible to grasp the timing suitable for activation of the wireless communication unit in the cutting tool, it is possible to perform activation of the wireless communication unit at an appropriate timing without requiring an input operation by an operator or installation of an external device.

In addition, by performing activation of the wireless communication unit at an appropriate timing, it is possible to suppress consumption of power necessary for wireless transmission of measurement information and to suppress an increase in wireless traffic particularly effectively in a tool system including a plurality of cutting tools.

Further, according to the above-described method, for example, at the timing at which machining is performed by the first cutting tool, the wireless communication unit in the first cutting tool can be activated, and the wireless communication unit in the second cutting tool can be stopped. That is, the control unit in each cutting tool can perform the first control with appropriate details according to the state of each cutting tool. Therefore, it is possible to realize more excellent functions in the system capable of monitoring the state of the cutting tool.

Hereinafter, embodiments of the present disclosure will be described with reference to the drawings. In the drawings, the same or corresponding portions are denoted by the same reference numerals, and description thereof will not be repeated. Further, at least a part of the embodiments described below may be arbitrarily combined.

[Configuration and Basic Operation]
(Tool System)

FIG. 1 is a diagram showing a configuration of a tool system according to an embodiment of the present disclosure.

Referring to FIG. 1, a tool system 300 includes a plurality of cutting tools 100 for turning, a management device 200, and a wireless base unit 201. Cutting tool 100 includes a cutting tool holder 2 and a sensor module 110. Sensor module 110 includes a measurement sensor. Hereinafter, cutting tool holder 2 is also simply referred to as holder 2. The plurality of cutting tools 100 are attached to, for example, machining equipment.

Wireless base unit 201 is connected to management device 200 in a wired manner, for example. Wireless base unit 201 is, for example, an access point.

Holder 2 holds a cutting insert 1 having a cutting edge. Sensor module 110 is provided in holder 2.

Holder 2 includes fixing members 3A and 3B. Fixing members 3A and 3B hold cutting insert 1.

Cutting insert 1 has, for example, a polygonal shape such as a triangle, a square, a rhombus, and a pentagon in a top view. Cutting insert 1 has, for example, a through hole formed in the center of the upper surface thereof, and is fixed to holder 2 by fixing members 3A and 3B.

Tool system 300 is not limited to a configuration including a plurality of cutting tools 100, and may be a configuration including one cutting tool 100. Further, tool system 300 is not limited to a configuration including one management device 200, and may be a configuration including a plurality of management devices 200.

Cutting tool 100 wirelessly transmits information based on the measurement result of the sensor in sensor module 110 to wireless base unit 201. For example, cutting tool 100 wirelessly transmits a sensor packet including measurement information based on the measurement result of the measurement sensor in sensor module 110 to wireless base unit 201.

Cutting tool 100 and wireless base unit 201 perform wireless communication using a communication protocol such as ZigBee® compliant with IEEE 802.15.4, Bluetooth® compliant with IEEE 802.15.1, or UWB (Ultra Wide Band) compliant with IEEE 802.15.3a. A communication protocol other than the above may be used between cutting tool 100 and wireless base unit 201.

Wireless base unit 201 relays the sensor packet received from cutting tool 100 to management device 200.

Management device 200 receives the sensor packet relayed by wireless base unit 201 and analyzes the measurement information included in the received sensor packet to monitor, for example, the state of cutting tool 100.

Specifically, based on the measurement information included in the received sensor packet, management device 200 predicts the lifetime of cutting insert 1 in cutting tool 100 that is the transmission source of the measurement information. Then, management device 200 performs, for example, notification for prompting the user to replace cutting insert 1 based on the prediction result.

(Specific Example of Tool System)

Figure 2:
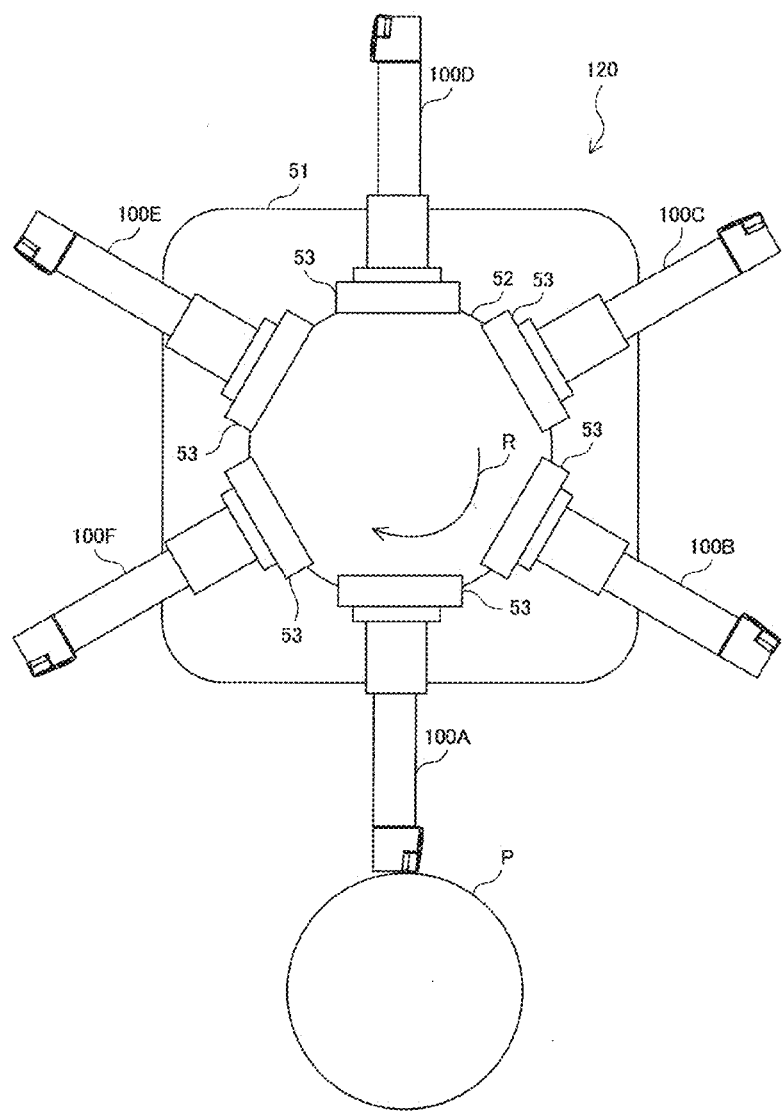
FIG. 2 is a diagram showing an example of a state in which a cutting tool in a tool system according to the embodiment of the present disclosure is attached to machining equipment.

FIG. 2 is a diagram showing an example of a state in which a cutting tool in a tool system according to the embodiment of the present disclosure is attached to machining equipment.

Referring to FIG. 2, a machining equipment 120 includes a motor holder 51, a motor (not shown) built in motor holder 51, and a turret 52 rotated by driving of the motor.

Turret 52 has, for example, a disk shape, and rotates in a circumferential direction indicated by an arrow R at a timing when cutting tool 100 used for machining is replaced. Further, turret 52 includes one tool holder 53 or a plurality of tool holders 53 on an outer peripheral portion thereof. Cutting tool 100 is attached to tool holder 53. In FIG. 2, as an example, turret 52 includes six tool holders 53, and six cutting tools 100 are attached to six tool holders 53 respectively.

Here, six cutting tools 100 shown in FIG. 2 are referred to as cutting tools 100A, 100B, 100C, 100D, 100E, and 100F. Further, in FIG. 2, cutting insert 1 in cutting tool 100A is located at a location in contact with a workpiece P (hereinafter, also referred to as "machining location"), and machining is performed on workpiece P by cutting tool 100A.

When the machining by cutting tool 100A is finished, turret 52 is rotated in the circumferential direction, and for example, cutting tool 100B is moved to the machining location. Then, machining is performed on workpiece P by cutting tool 100B.

When the machining by cutting tool 100B is finished, turret 52 is rotated again in the circumferential direction, and for example, cutting tool 100C is moved to the machining location. Then, machining is performed on workpiece P by cutting tool 100C.

In this way, by rotating turret 52, it is possible to exchange cutting tool 100 used for machining without carrying cutting tool 100 or workpiece P.

(Sensor Module)

Figure 3:
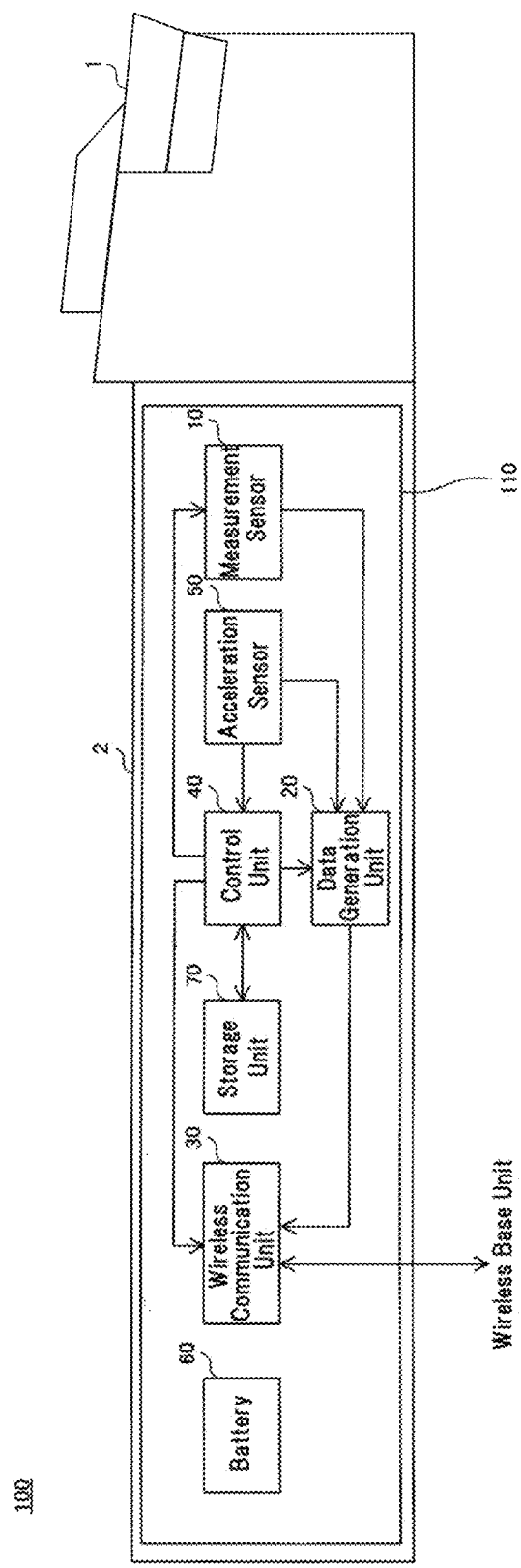
FIG. 3 is a diagram showing a configuration of a sensor module according to the embodiment of the present disclosure.

FIG. 3 is a diagram showing a configuration of a sensor module according to the embodiment of the present disclosure.

Referring to FIG. 3, sensor module 110 includes a measurement sensor 10, a data generation unit 20, a wireless communication unit 30, a control unit 40, an acceleration sensor 50, a battery 60, and a storage unit 70. Storage unit 70 is, for example, a nonvolatile memory. Wireless communication unit 30 is provided with a communication circuit such as a communication IC (Integrated Circuit).

Battery 60 is a power storage device including, for example, a primary battery, a secondary battery, a solar battery, or a capacitor. Battery 60 stores energy and supplies electric power to each circuit of wireless communication unit 30 and the like in sensor module 110 using the stored energy.

For example, acceleration sensor 50 regularly or irregularly measures gravitational acceleration, and outputs an analog signal indicating a measurement result to control unit 40. Acceleration sensor 50 is always driven by electric power supplied from battery 60 during operation of tool system 300, for example.

Measurement sensor 10 includes, for example, at least one of a strain sensor, a pressure sensor, a sound sensor, and a temperature sensor. Measurement sensor 10 is provided, for example, in the vicinity of cutting insert 1 in holder 2.

Measurement sensor 10 measures at least one of physical quantities such as strain, pressure, sound, and temperature, and outputs an analog signal indicating the measured physical quantity to data generation unit 20. Measurement sensor 10 is driven by electric power supplied from battery 60, for example.

Measurement sensor 10 switches between a measurement state, which is an activated state, and a non-measurement state, which is a non-activated state. Measurement sensor 10 performs measurement in the measurement state, outputs an analog signal indicating the measured physical quantity to data generation unit 20, and stops in the non-measurement state.

Data generation unit 20 creates measurement information including a measurement result of measurement sensor 10 or information based on the measurement result. More specifically, data generation unit 20 receives an analog signal from measurement sensor 10, and creates measurement information including a measurement result acquired by performing AD (Analog Digital) conversion on the received analog signal or measurement information including a value acquired by performing calculation such as averaging on the measurement result.

Data generation unit 20 creates a sensor packet in which the created measurement information, the sensor ID of measurement sensor 10, and the like are stored, and outputs the created sensor packet to wireless communication unit 30.

Wireless communication unit 30 transmits measurement information based on a measurement result of the sensor attached to cutting tool 100 to wireless base unit 201 outside cutting tool 100. More specifically, wireless communication unit 30 wirelessly transmits the sensor packet in which the measurement information, the sensor ID of measurement sensor 10, and the like received from data generation unit 20 are stored to wireless base unit 201. Wireless communication unit 30 is driven by electric power supplied from the battery.

Wireless communication unit 30 switches between a reporting state, which is an activated state, and a non-reporting state, which is a non-activated state. Wireless communication unit 30 wirelessly transmits the sensor packet to wireless base unit 201 in the reporting state, and does not wirelessly transmit the sensor packet to wireless base unit 201 in the non-reporting state.

Control unit 40 is provided with a processor such as CPU (Central Processing Unit) and MPU (Micro Processing Unit). Control unit 40 performs a first activation control for controlling activation of wireless communication unit 30 and a second activation control for controlling activation of measurement sensor 10 based on the measurement result of acceleration sensor 50.

That is, control unit 40 performs a switching process for switching between the reporting state and the non-reporting state of wireless communication unit 30 as first activation control. In addition, control unit 40 performs the switching process of switching between the measurement state and the non-measurement state of measurement sensor 10 as the second activation control.

More specifically, storage unit 70 stores, for example, a correspondence table T indicating a correspondence relationship among the measurement result of acceleration sensor 50, the position of cutting tool 100 with respect to workpiece P, the state of wireless communication unit 30, and the state of measurement sensor 10.

The position of cutting tool 100 relative to workpiece P is determined by the angle of the rake face of cutting tool 100 relative to workpiece P, i.e., the angle of the chip delivery surface, and the location of cutting tool 100 relative to workpiece P. Hereinafter, the position of cutting tool 100 with respect to workpiece P may be simply referred to as a "position of cutting tool 100".

Control unit 40 determines the position of each cutting tool 100 based on the measurement result of acceleration sensor 50 with reference to correspondence table T stored in storage unit 70. That is, control unit 40 determines the position of cutting tool 100 including sensor module 110 including control unit 40. Then, control unit 40 refers to correspondence table T and performs a switching process between the reporting state and the non-reporting state of wireless communication unit 30 and between the measurement state and the non-measurement state of measurement sensor 10 based on the determined position of cutting tool 100.

(Specific Example 1 of Switching Process)

Figures 4, 5:
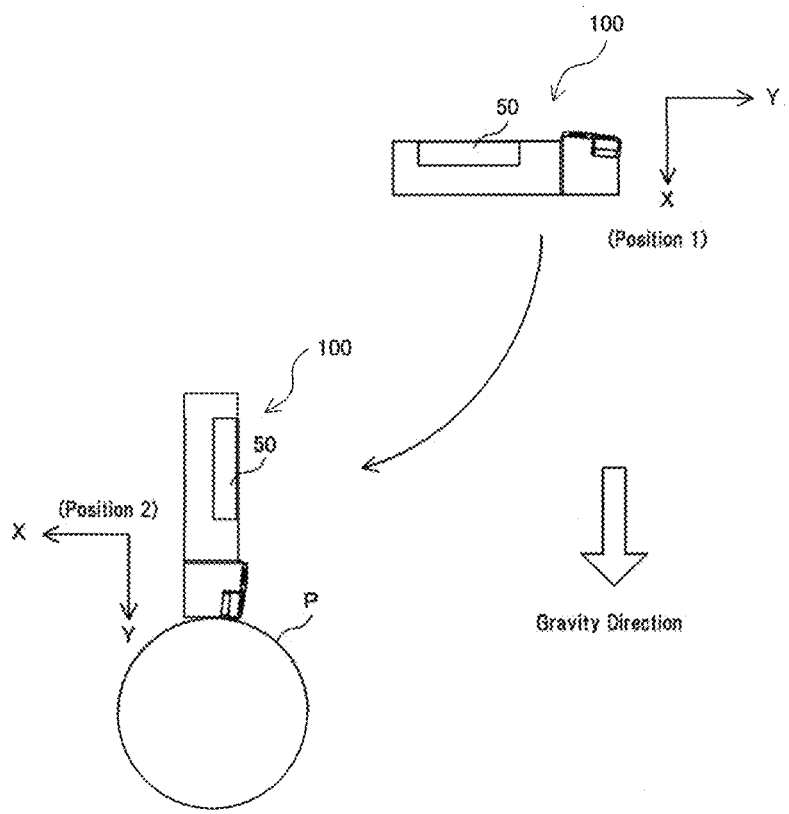
FIG. 4 is a diagram showing a change in position of a cutting tool when a tool system according to the embodiment of the present disclosure includes one cutting tool.
FIG. 5 is a diagram showing an example of a correspondence table stored in a storage unit of a cutting tool according to the embodiment of the present disclosure.

FIG. 4 is a diagram showing a change in position of a cutting tool when a tool system according to the embodiment of the present disclosure includes one cutting tool. FIG. 5 is a diagram showing an example of a correspondence table stored in a storage unit of a cutting tool according to the embodiment of the present disclosure.

Referring to FIGS. 3 to 5, a position of cutting tool 100 in a state where machining by cutting tool 100 is not performed is referred to as "position 1", and a position of cutting tool 100 in a state where machining by cutting tool 100 is performed is referred to as "position 2".

Here, acceleration sensor 50 in cutting tool 100 measures the gravitational acceleration of cutting tool 100 in the radial direction (hereinafter also referred to as "Y-direction") of turret 52. According to a change in the position of cutting tool 100 due to rotation of turret 52, the gravitational acceleration in the Y direction that cutting tool 100 experiences changes.

Storage unit 70 stores a correspondence table T1, which is correspondence table T. Correspondence table T1 indicates that the position of cutting tool 100 is "position 1" when the measurement result of acceleration sensor 50 is other than 1 G. In addition, correspondence table T1 indicates that the position of cutting tool 100 is "position 2" when the measurement result of acceleration sensor 50 is 1 G.

In addition, correspondence table T1 indicates that when the position of cutting tool 100 is "position 1", wireless communication unit 30 is set to the non-reporting state and measurement sensor 10 is set to the non-measurement state. In addition, correspondence table T1 indicates that when the position of cutting tool 100 is "position 2", wireless communication unit 30 is set to the reporting state and measurement sensor 10 is set to the measurement state.

Further, correspondence table T1 indicates that acceleration sensor 50 is always driven.

Control unit 40 determines the position of cutting tool 100 based on the measurement result indicated by the analog signal received from acceleration sensor 50 and correspondence table T1. Then, control unit 40 performs the first activation control and the second activation control of which details correspond to the determined positions.

Specifically, control unit 40 determines that the position of cutting tool 100 is "position 2" when wireless communication unit 30 is in the non-reporting state and measurement sensor 10 is in the non-measurement state, and in this case, control unit 40 switches wireless communication unit 30 from the non-reporting state to the reporting state as the first activation control. Further, control unit 40 switches measurement sensor 10 from the non-measurement state to the measurement state as the second activation control.

In addition, control unit 40 determines that the position of cutting tool 100 is "position 2" when wireless communication unit 30 is in the reporting state and measurement sensor 10 is in the measurement state, and in this case, control unit 40 continues the reporting state of wireless communication unit 30 and the measurement state of measurement sensor 10 as the first activation control and the second activation control.

In addition, control unit 40 determines that the position of cutting tool 100 is "position 1" when wireless communication unit 30 is in the reporting state and measurement sensor 10 is in the measurement state, and in this case, control unit 40 switches wireless communication unit 30 from the reporting state to the non-reporting state as the first activation control. In addition, control unit 40 switches measurement sensor 10 from the measurement state to the non-measurement state as second activation control.

In addition, control unit 40 determines that the position of cutting tool 100 is "position 1" when wireless communication unit 30 is in the non-reporting state and measurement sensor 10 is in the non-measurement state, and in this case, control unit 40 continues the non-reporting state of wireless communication unit 30 and the non-measurement state of measurement sensor 10 as the first activation control and the second activation control.

Hereinafter, both the switching process of wireless communication unit 30 from the non-reporting state to the reporting state and the process of continuing the reporting state of wireless communication unit 30 are also referred to as "a switching process of wireless communication unit 30 to the reporting state". In addition, both the switching process of wireless communication unit 30 from the reporting state to the non-reporting state and the process of continuing the non-reporting state of wireless communication unit 30 are also referred to as "a switching process of wireless communication unit 30 to the non-reporting state".

In addition, both the switching process of measurement sensor 10 from the non-measurement state to the measurement state and the process of continuing the measurement state of measurement sensor 10 are also referred to as "a switching process of measurement sensor 10 to the measurement state". In addition, both the switching process of measurement sensor 10 from the measurement state to the non-measurement state and the process of continuing the non-measurement state of measurement sensor 10 are also referred to as "a switching process of measurement sensor 10 to the non-measurement state".

(Specific Example 2 of Switching Process)

Figures 6, 7:
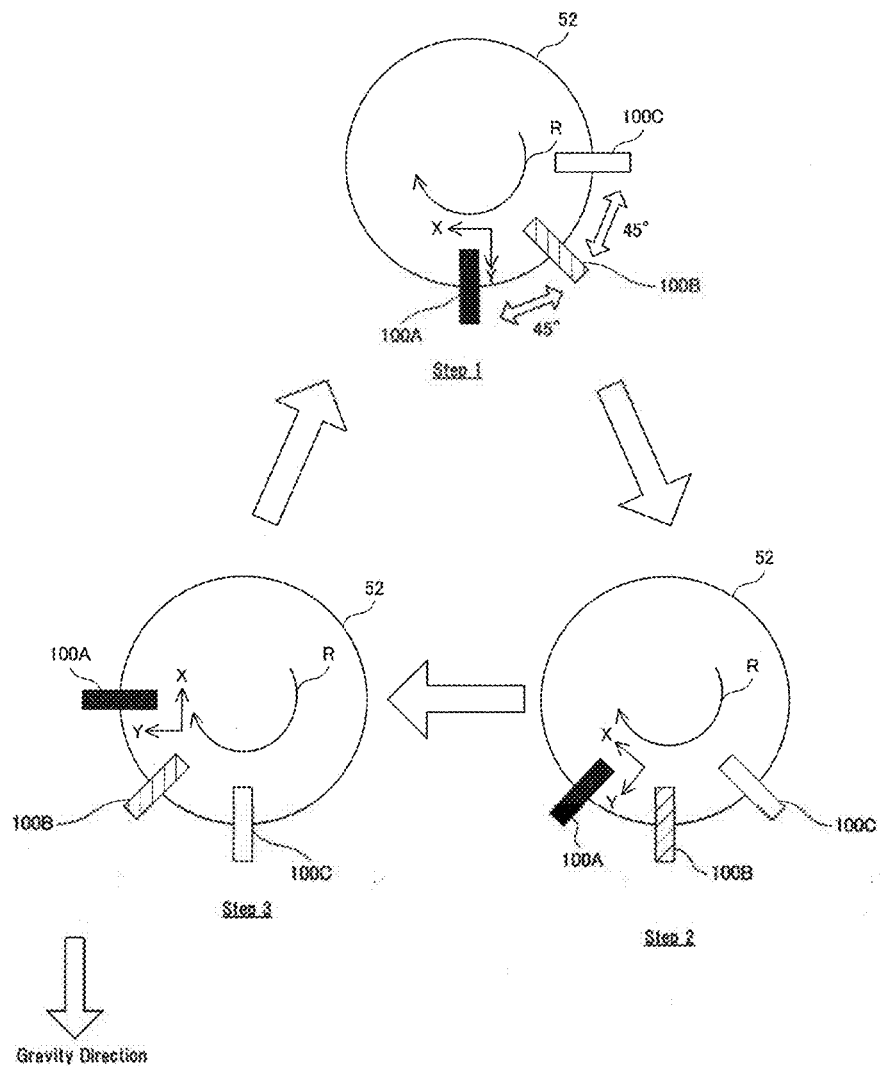
FIG. 6 is a diagram showing a change in position of each cutting tool when the tool system according to the embodiment of the present disclosure includes three cutting tools.
FIG. 7 is a diagram showing an example of a correspondence table stored in a storage unit of a cutting tool according to the embodiment of the present disclosure.

FIG. 6 is a diagram showing a change in position of each cutting tool when the tool system according to the embodiment of the present disclosure includes three cutting tools.

Referring to FIG. 6, here, three cutting tools 100A, 100B and 100C, which correspond to cutting tool 100, are mounted on turret 52 at 45° intervals. Further, a step in which machining is performed by cutting tool 100A is referred to as "step 1", a step in which machining is performed by cutting tool 100B is referred to as "step 2", and a step in which machining is performed by cutting tool 100C is referred to as "step 3".

Further, here, acceleration sensor 50 in each cutting tool 100 measures acceleration in two directions. More specifically, acceleration sensor 50 measures the gravitational acceleration of corresponding cutting tool 100 in a direction tangential to turret 52 and along a rotational direction of turret 52 as indicated by arrow R (hereinafter referred to as "X-direction"), and the gravitational acceleration of corresponding cutting tool 100 in a radial direction, that is "Y-direction", of turret 52.

Hereinafter, the gravitational acceleration in the X direction may be referred to as an "X value", and the gravitational acceleration in the Y direction may be referred to as a "Y value". The X value and the Y value change according to a change in the position of cutting tool 100 caused by the rotation of turret 52.

In addition, control unit 40 in each cutting tool 100 determines the three positions of each cutting tool 100, and performs the first activation control and the second activation control of which details correspond to the determined positions. The three positions include a "machining position" in which machining is performed by cutting tool 100, a "stop position" in which cutting tool 100 is not in contact with workpiece P, and a "preparation position" just before machining is performed by cutting tool 100.

The "stop position" is a position in a state in which machining by cutting tool 100 is not performed, and is, for example, a position of cutting tool 100 at a stop location before the machining position. The position of cutting tool 100 at a location away from the gravity direction by an angle of 90 degrees or more in the counter-rotation direction of turret 52 may be defined as the "stop position".

The "preparation position" is a position during the change of the position of cutting tool 100 from the stop position to the machining position, and is, for example, the position of cutting tool 100 at the stop location between the stop position and the machining position. The "preparation position" may be a position of cutting tool 100 at an angle greater than 0 degrees and less than 90 degrees from the gravity direction in the counter-rotation direction of turret 52. Further, the position of cutting tool 100 at a location between a stop location Ps1, which is the machining position, and a stop location Ps2 just before stop location Ps1 in the rotational direction of turret 52 may be defined as the "preparation position".

FIG. 7 is a diagram showing an example of a correspondence table stored in a storage unit of a cutting tool according to the embodiment of the present disclosure.

Referring to FIG. 7, a correspondence table T2, which is correspondence table T, is stored in storage unit 70 of each of cutting tools 100A, 100B, and 100C. Correspondence table T2 indicates that the position of cutting tool 100 is the "machining position" when the X value and the Y value are (0 G, 1 G).

In addition, correspondence table T2 indicates that the position of cutting tool 100 is the "preparation position" when the X value and the Y value are (0.5 G, 0.5 G) or (−1 G, 0 G).

In addition, correspondence table T2 indicates that the position of cutting tool 100 is "stop position" when the X value and the Y value are (1 G, 0 G) or (−0.5 G, 0.5 G).

In addition, correspondence table T2 indicates that when the position of cutting tool 100 is the "machining position", wireless communication unit 30 is set to the reporting state and measurement sensor 10 is set to the measurement state.

In addition, correspondence table T2 indicates that when the position of cutting tool 100 is "preparation position", wireless communication unit 30 is set to the reporting state and measurement sensor 10 is set to the non-measurement state.

In addition, correspondence table T2 indicates that when the position of cutting tool 100 is "stop position", wireless communication unit 30 is set to the non-reporting state and measurement sensor 10 is set to the non-measurement state.

In addition, correspondence table T2 indicates that acceleration sensor 50 is always driven.

(a) Step 1

FIG. 8 is a diagram for explaining the details of the first activation control and the second activation control by the control unit in each cutting tool in step 1 shown in FIG. 6.

Referring to FIGS. 3 and 6 to 8, control unit 40 in each of cutting tools 100A, 100B, and 100C performs the first activation control and the second activation control based on the X value and the Y value indicated by the analog signal received from acceleration sensor 50 and correspondence table T2.

More specifically, for example, each time control unit 40 receives an analog signal from acceleration sensor 50, control unit 40 checks a combination of the X value and the Y value indicated by the analog signal. Then, when the newly acquired combination of the X value and the Y value matches any one of the plurality of combinations of the X value and the Y value indicated in correspondence table T2, control unit 40 determines the corresponding position of cutting tool 100.

For example, at timings when cutting tools 100A, 100B, and 100C change positions with respect to workpiece P, the determined results of the positions by respective control units 40 are different from each other. Thus, each control unit 40 performs the first activation control and the second activation control having different details from each other based on the determined result.

To be specific, in step 1, the X value and the Y value by acceleration sensor 50 in cutting tool 100A are (0 G, 1 G). Control unit 40 in cutting tool 100A determines that the position of cutting tool 100A is the "machining position" with reference to correspondence table T2, and performs the switching process of wireless communication unit 30 to the reporting state and the switching process of measurement sensor 10 to the measurement state based on the determined result.

In step 1, the X value and the Y value by acceleration sensor 50 in cutting tool 100B are (0.5 G, 0.5 G). Control unit 40 in cutting tool 100B determines that the position of cutting tool 100B is the "preparation position" with reference to correspondence table T2, and performs the switching process of wireless communication unit 30 to the reporting state and the switching process of measurement sensor 10 to the non-measurement state based on the determined result.

In step 1, the X value and the Y value by acceleration sensor 50 in cutting tool 100C are (1 G, 0 G). Control unit 40 in cutting tool 100C determines that the position of cutting tool 100C is the "stop position" with reference to correspondence table T2, and performs the switching process of wireless communication unit 30 to the non-reporting state and the switching process of measurement sensor 10 to the non-measurement state based on the determined result.

(b) Step 2

FIG. 9 is a diagram for explaining the details of the first activation control and the second activation control by the control unit in each cutting tool in step 2 shown in FIG. 6.

Referring to FIGS. 3, 6, 7 and 9, in step 2, the X value and the Y value by acceleration sensor 50 at cutting tool 100A are (−0.5 G, 0.5 G). Control unit 40 in cutting tool 100A determines the position of cutting tool 100A is the "stop position", and performs the switching process of wireless communication unit 30 to the non-reporting state and the switching process of measurement sensor 10 to the non-measurement state based on the determined result.

In step 2, the X value and the Y value by acceleration sensor 50 in cutting tool 100B are (0 G, 1 G). Control unit 40 in cutting tool 100B determines the position of cutting tool 100B is the "machining position", and performs the switching process of wireless communication unit 30 to the reporting state and the switching process of measurement sensor 10 to the measurement state based on the determined result.

In step 2, the X value and the Y value by acceleration sensor 50 in cutting tool 100C are (0.5 G, 0.5 G). Control unit 40 in cutting tool 100C determines that the position of cutting tool 100C is the "preparation position", and performs switching process of wireless communication unit 30 to the reporting state and switching process of measurement sensor 10 to the non-measurement state based on the determined result.

(c) Step 3

FIG. 10 is a diagram for explaining the details of the first activation control and the second activation control by the control unit in each cutting tool in step 3 shown in FIG. 6.

Referring to FIGS. 3, 6, 7, and 10, in step 3, the X value and the Y value from acceleration sensor 50 at cutting tool 100A are (−1 G, 0 G). Control unit 40 in cutting tool 100A determines that the position of cutting tool 100A is the "preparation position", and performs switching process of wireless communication unit 30 to the reporting state and switching process of measurement sensor 10 to the non-measurement state based on the determined result.

In step 3, the X value and the Y value by acceleration sensor 50 in cutting tool 100B are (−0.5 G, 0.5 G). Control unit 40 in cutting tool 100B determines the position of cutting tool 100B is the "stop position", and performs the switching process of wireless communication unit 30 to the non-reporting state and the switching process of measurement sensor 10 to the non-measurement state based on the determined result.

In step 3, the X value and the Y value by acceleration sensor 50 in cutting tool 100C are (0 G, 1 G). Control unit 40 in cutting tool 100C determines the position of cutting tool 100C is the "machining position", and performs the switching process of wireless communication unit 30 to the reporting state and the switching process of measurement sensor 10 to the measurement state based on the determined result.

Cutting tool 100 is not limited to the configuration including acceleration sensor 50 that measures gravitational acceleration in two directions. For example, cutting tool 100 may include acceleration sensor 50 that measures gravitational acceleration in three or more directions, or may include a plurality of acceleration sensors 50 each of which measures gravitational acceleration in a single direction. In addition, cutting tool 100 may include single acceleration sensor 50 that measures gravitational acceleration in a single direction.

Cutting tool 100 may further transmit information based on the measurement result by acceleration sensor 50 to management device 200 in addition to the information based on the measurement result by measurement sensor 10.

In this case, acceleration sensor 50 outputs an analog signal indicating the measurement result to data generation unit 20. Data generation unit 20 creates measurement information including information based on the measurement result of measurement sensor 10 and information based on the measurement result of acceleration sensor 50, and outputs the created measurement information to wireless communication unit 30. Wireless communication unit 30 transmits the measurement information received from data generation unit 20 to wireless base unit 201.

Further, cutting tool 100 may not include measurement sensor 10. In this case, wireless communication unit 30 transmits, for example, measurement information including information based on the measurement result by acceleration sensor 50 to wireless base unit 201. In this case, control unit 40 does not perform the second activation control.

Also in the case where tool system 300 includes two cutting tools 100, the configuration and operation are similar to those in the case where tool system 300 includes three cutting tools 100 described above.

In addition, control unit 40 is not limited to be configured to determine the position of cutting tool 100, and may be configured to determine any state of cutting tool 100 and perform the first activation control using the determined result.

[Operation]

Next, an operation procedure when cutting tool 100 in tool system 300 according to the embodiment of the present disclosure performs the first activation control and the second activation control will be described with reference to the drawings.

Each device in the tool system according to the embodiment of the present disclosure is provided with a computer including a memory, and an arithmetic processing unit such as a CPU in the computer reads a program including a part or all of each step of the following flowcharts and sequences from the memory and executes the program. The respective programs of the plurality of devices can be installed from the outside. The respective programs of the plurality of devices are distributed in a state of being stored in recording media.

(Operation Procedure of First Activation Control and Second Activation Control in Case of Specific Example 1)

Figure 11:
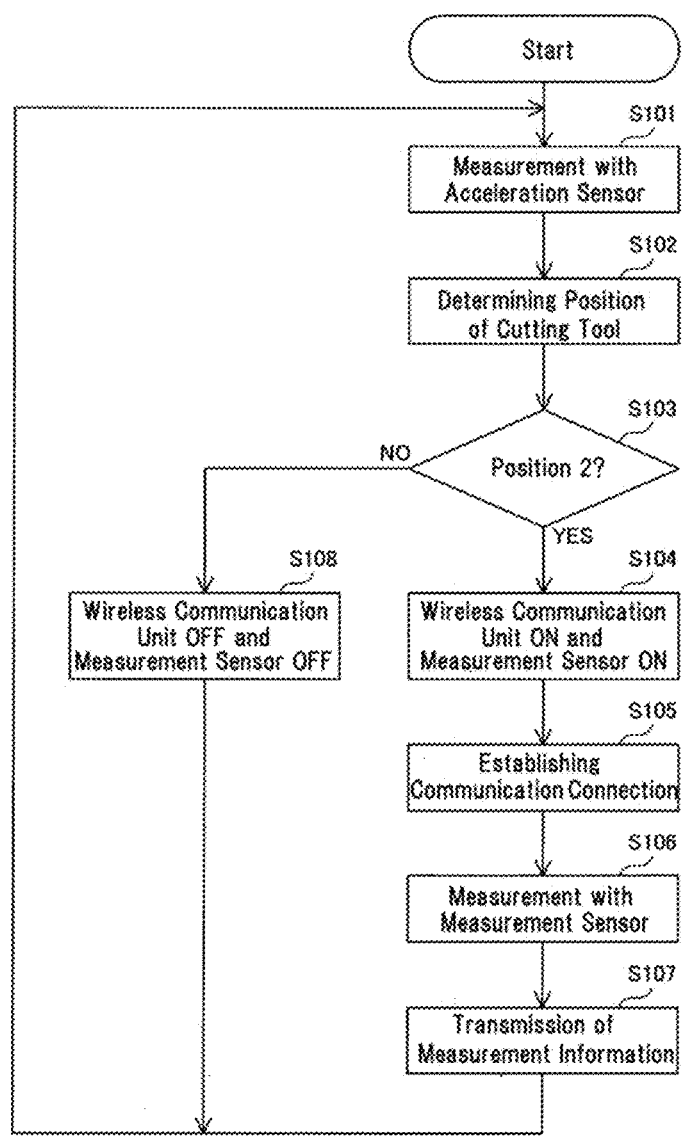
FIG. 11 is a flowchart defining an operation procedure of the first activation control and the second activation control by the control unit in the case of the specific example 1 shown in FIG. 4.

FIG. 11 is a flowchart defining an operation procedure of the first activation control and the second activation control by the control unit in the case of the specific example 1 shown in FIG. 4.

Referring to FIGS. 4, 5 and 11, first, acceleration sensor 50 measures the gravitational acceleration of cutting tool 100 and outputs an analog signal indicating the measurement result to control unit 40 (step S101).

Next, control unit 40 receives the analog signal output from acceleration sensor 50, and determines the position of cutting tool 100 based on the measurement result indicated by the analog signal and correspondence table T1 stored in storage unit 70 (step S102).

Next, when control unit 40 determines that the position of cutting tool 100 is "Position 2" ("YES" in step S103), control unit 40 performs a switching process of wireless communication unit 30 to the reporting state as the first activation control. That is, control unit 40 activates wireless communication unit 30. In addition, control unit 40 performs a switching process of measurement sensor 10 to the measurement state as the second activation control. That is, control unit 40 activates measurement sensor 10 (step S104).

Next, wireless communication unit 30 establishes a communication connection between cutting tool 100 and management device 200 (step S105). When the communication connection between cutting tool 100 and management device 200 is established, wireless communication unit 30 maintains the connection state.

Next, measurement sensor 10 measures at least one of physical quantities such as accelerations, strains, pressures, sounds, and temperatures, and outputs an analog signal indicating the measured physical quantity to data generation unit 20 (step S106).

Next, data generation unit 20 creates measurement information including the measurement result of measurement sensor 10 or information based on the measurement result, and outputs the created measurement information to wireless communication unit 30. Then, wireless communication unit 30 transmits the measurement information received from data generation unit 20 to management device 200 via wireless base unit 201 (step S107).

Next, acceleration sensor 50 measures the gravitational acceleration of cutting tool 100 again and outputs an analog signal indicating the measurement result to control unit 40 (step S101).

Next, control unit 40 receives the analog signal output from acceleration sensor 50 and determines the position of cutting tool 100 again based on the measurement result indicated by the analog signal and correspondence table T1 stored in storage unit 70 (step S102).

Next, when control unit 40 determines that the position of cutting tool 100 is "Position 1" ("NO" in step S103), control unit 40 performs a switching process of wireless communication unit 30 to the non-reporting state as the first activation control. That is, control unit 40 stops wireless communication unit 30. In addition, control unit 40 performs a switching process of measurement sensor 10 to the non-measurement state as the second activation control. That is, control unit 40 stops measurement sensor 10 (step S108).

The measurement by measurement sensor 10 (step S106) and the transmission of the measurement information by wireless communication unit 30 (step S107) described above are repeated regularly or irregularly until the switching process of wireless communication unit 30 to the non-reporting state and the switching process of measurement sensor 10 to the non-measurement state (step S108) are performed.

(Operation Procedure of First Activation Control and Second Activation Control in Case of Specific Example 2)

Figure 12:
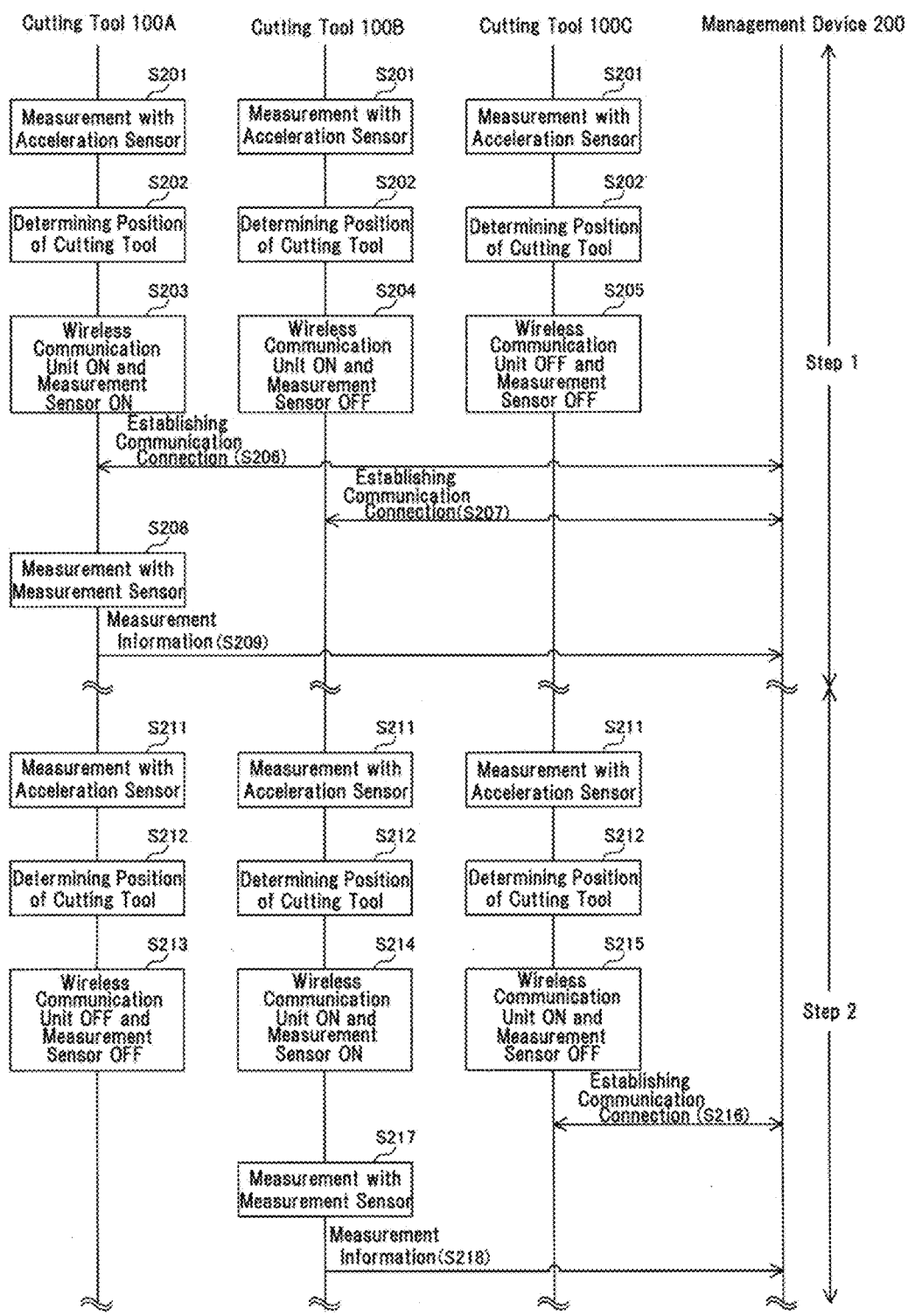
FIG. 12 is a sequence diagram defining an operation procedure of the first activation control and the second activation control by each control unit in the case of the specific example 2 shown in FIG. 6.
Figure 13:
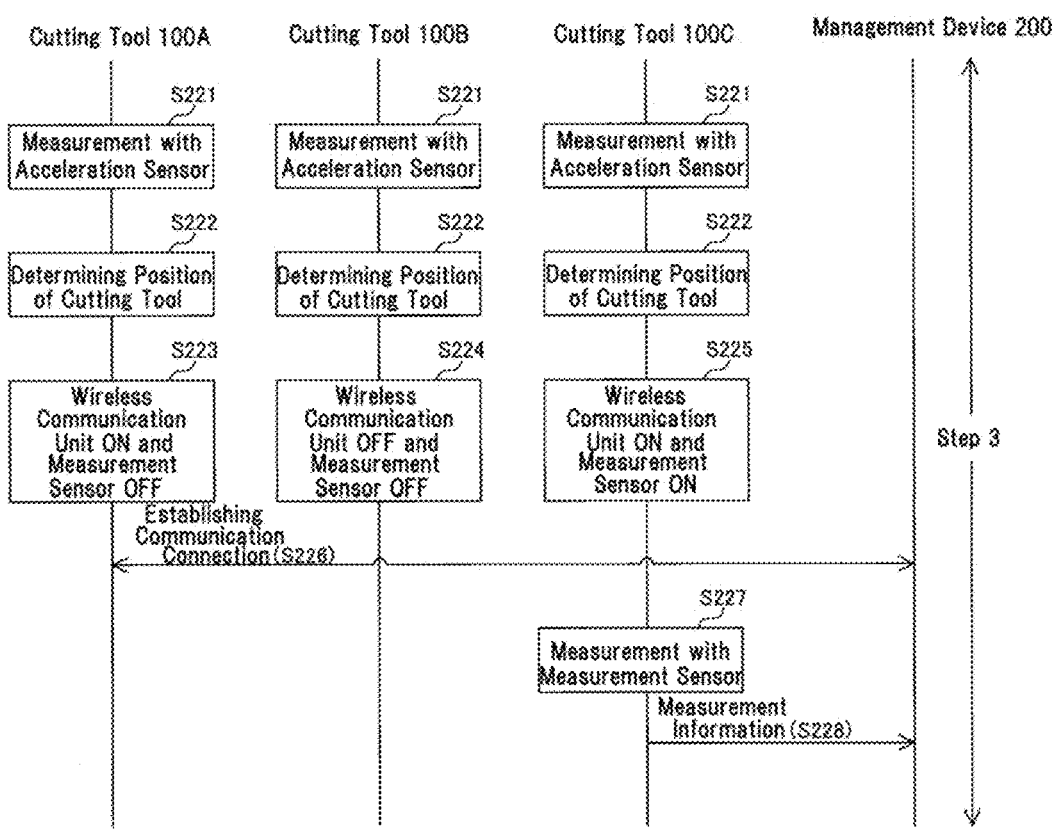
FIG. 13 is a sequence diagram defining an operation procedure of the first activation control and the second activation control by each control unit in the case of the specific example 2 shown in FIG. 6.

FIG. 12 and FIG. 13 are sequence diagrams defining operation procedures of the first activation control and the second activation control by each control unit in the case of the specific example 2 shown in FIG. 6.

Referring to FIGS. 6 to 9, 12, and 13, first, acceleration sensor 50 in each of cutting tools 100A, 100B, and 100C measures the X value and the Y value that are gravitational accelerations of corresponding cutting tool 100, and outputs an analog signal indicating a measurement result to corresponding control unit 40 (step S201).

Next, control unit 40 in each of cutting tools 100A, 100B, and 100C receives the analog signal output from corresponding acceleration sensor 50, and determines the position of corresponding cutting tool 100 based on the measurement result indicated by the analog signal and correspondence table T2 stored in corresponding storage unit 70.

Here, control unit 40 in cutting tool 100A determines the position of cutting tool 100A as the "machining position". Control unit 40 in cutting tool 100B determines the position of cutting tool 100B as the "preparation position". Control unit 40 in cutting tool 100C determines that the position of cutting tool 100C is "stop position" (step S202).

Next, control unit 40 in cutting tool 100A performs a switching process of wireless communication unit 30 to the reporting state and a switching process of measurement sensor 10 to the measurement state (step S203).

Next, control unit 40 in cutting tool 100B performs a switching process of wireless communication unit 30 to the reporting state and a switching process of measurement sensor 10 to the non-measurement state (step S204).

Next, control unit 40 in cutting tool 100C performs a switching process of wireless communication unit 30 to the non-reporting state and a switching process of measurement sensor 10 to the non-measurement state (step S205).

Next, wireless communication unit 30 in cutting tool 100A establishes a communication connection between cutting tool 100A and management device 200 (step S206). When the communication connection between cutting tool 100A and management device 200 is established, wireless communication unit 30 maintains the connection state.

Next, wireless communication unit 30 in cutting tool 100B establishes a communication connection between cutting tool 100B and management device 200 (step S207). When the communication connection between cutting tool 100B and management device 200 is established, wireless communication unit 30 maintains the connection state.

Next, measurement sensor 10 in cutting tool 100A measures at least one of physical quantities such as accelerations, strains, pressures, sounds, and temperatures, and outputs an analog signal indicating the measured physical quantity to corresponding data generation unit 20 (step S208).

Next, data generation unit 20 in cutting tool 100A creates measurement information including the measurement result of measurement sensor 10 or information based on the measurement result, and outputs the created measurement information to corresponding wireless communication unit 30. Then, wireless communication unit 30 transmits the measurement information received from data generation unit 20 to management device 200 via wireless base unit 201 (step S209).

Next, acceleration sensor 50 in each of cutting tools 100A, 100B, and 100C measures the X value and the Y value that are the gravitational accelerations of corresponding cutting tool 100 again, and outputs an analog signal indicating the measurement result to corresponding control unit 40 (step S211).

Next, control unit 40 in each of cutting tools 100A, 100B, and 100C receives the analog signal output from corresponding acceleration sensor 50, and determines the position of corresponding cutting tool 100 based on the measurement result indicated by the analog signal and correspondence table T2 stored in corresponding storage unit 70.

Here, control unit 40 in cutting tool 100A determines that the position of cutting tool 100A as the "stop position". Further, control unit 40 in cutting tool 100B determines the position of cutting tool 100B as the "machining position". Control unit 40 in cutting tool 100C determines that the position of cutting tool 100C as the "preparation position" (step S212).

Next, control unit 40 in cutting tool 100A performs a switching process of wireless communication unit 30 to the non-reporting state and a switching process of measurement sensor 10 to the non-measurement state (step S213).

The measurement by measurement sensor 10 (step S208) and the transmission of the measurement information by wireless communication unit 30 (step S209) in cutting tool 100A described above are repeated regularly or irregularly until the switching process of wireless communication unit 30 to the non-reporting state and the switching process of measurement sensor 10 to the non-measurement state (step S213) are performed.

Next, control unit 40 in cutting tool 100B performs a switching process of wireless communication unit 30 to the reporting state and a switching process of measurement sensor 10 to the measurement state (step S214).

Next, control unit 40 in cutting tool 100C performs a switching process of wireless communication unit 30 to the reporting state and a switching process of measurement sensor 10 to the non-measurement state (step S215).

Next, wireless communication unit 30 in cutting tool 100C establishes a communication connection between cutting tool 100C and management device 200 (step S216). Here, the communication connection between cutting tool 100A and management device 200 is disconnected, and the communication connection between cutting tool 100B and management device 200 is maintained.

Next, measurement sensor 10 in cutting tool 100B measures at least one of physical quantities such as accelerations, strains, pressures, sounds, and temperatures, and outputs an analog signal indicating the measured physical quantity to corresponding data generation unit 20 (step S217).

Next, data generation unit 20 in cutting tool 100B creates measurement information including the measurement result of measurement sensor 10 or information based on the measurement result, and outputs the created measurement information to corresponding wireless communication unit 30. Then, wireless communication unit 30 transmits the measurement information received from data generation unit 20 to management device 200 via wireless base unit 201 (step S218).

Next, acceleration sensor 50 in each of cutting tools 100A, 100B, and 100C measures the X value and the Y value that are the gravitational accelerations of corresponding cutting tool 100 again, and outputs an analog signal indicating the measurement result to corresponding control unit 40 (step S221).

Next, control unit 40 in each of cutting tools 100A, 100B, and 100C receives the analog signal output from corresponding acceleration sensor 50, and determines the position of corresponding cutting tool 100 based on the measurement result indicated by the analog signal and correspondence table T2 stored in corresponding storage unit 70.

Here, control unit 40 in cutting tool 100A determines the position of cutting tool 100A as the "preparation position". In addition, control unit 40 in cutting tool 100B determines the position of cutting tool 100B as the "stop position". Control unit 40 in cutting tool 100C determines the position of cutting tool 100C as the "machining position" (step S222).

Next, control unit 40 in cutting tool 100A performs a switching process of wireless communication unit 30 to the reporting state and a switching process of measurement sensor 10 to the non-measurement state (step S223).

Next, control unit 40 in cutting tool 100B performs a switching process of wireless communication unit 30 to the non-reporting state and a switching process of measurement sensor 10 to the non-measurement state (step S224).

The measurement by measurement sensor 10 (step S217) and the transmission of the measurement information by wireless communication unit 30 (step S218) in cutting tool 100B described above are repeated regularly or irregularly until the switching process of wireless communication unit 30 to the non-reporting state and the switching process of measurement sensor 10 to the non-measurement state (step S224) are performed.

Next, control unit 40 in cutting tool 100C performs a switching process of wireless communication unit 30 to the reporting state and a switching process of measurement sensor 10 to the measurement state (step S225).

Next, wireless communication unit 30 in cutting tool 100A establishes a communication connection between cutting tool 100A and management device 200 (step S226). Here, the communication connection between cutting tool 100B and management device 200 is disconnected, and the communication connection between cutting tool 100C and management device 200 is maintained.

Next, measurement sensor 10 in cutting tool 100C measures at least one of physical quantities such as accelerations, strains, pressures, sounds, and temperatures, and outputs an analog signal indicating the measured physical quantity to corresponding data generation unit 20 (step S227).

Next, data generation unit 20 in cutting tool 100C creates measurement information including the measurement result of measurement sensor 10 or information based on the measurement result, and outputs the created measurement information to corresponding wireless communication unit 30. Then, wireless communication unit 30 transmits the measurement information received from data generation unit 20 to management device 200 via wireless base unit 201 (step S228).

Modification

Wireless communication unit 30 in cutting tool 100 may transmit information indicating the determined result of the position of cutting tool 100 by control unit 40 to management device 200 via wireless base unit 201.

More specifically, control unit 40 determines the position of cutting tool 100 and creates position information indicating the determined result. Then, control unit 40 outputs the created position information to data generation unit 20.

Data generation unit 20 creates measurement information including information based on the measurement result of measurement sensor 10 and the position information received from control unit 40, and outputs the created measurement information to wireless communication unit 30.

Wireless communication unit 30 transmits the measurement information received from data generation unit 20 to management device 200 via wireless base unit 201.

Management device 200 displays the detail based on the position information included in the measurement information received from wireless communication unit 30. For example, management device 200 displays the ID of cutting tool 100 corresponding to wireless communication unit 30, the position of cutting tool 100 indicated by the position information, and the measurement result of measurement sensor 10 included in the measurement information on a monitor or a display device included in management device 200.

To be specific, tool system 300 includes three cutting tools 100A, 100B, and 100C.

As described above, when the position of cutting tool 100A is the machining position, wireless communication unit 30 of cutting tool 100A is in the reporting state, and measurement sensor 10 of cutting tool 100A is in the measurement state. Therefore, on the screen G displayed by management device 200, for example, the ID of cutting tool 100A, the fact that the position of cutting tool 100A is "machining position", and the measurement results of measurement sensor 10 of cutting tool 100A are displayed.

When the position of cutting tool 100B is the preparation position, wireless communication unit 30 of cutting tool 100B is in the reporting state, and measurement sensor 10 of cutting tool 100B is in the non-measurement state. Therefore, on the screen G, for example, the ID of cutting tool 100B and the fact that the position of cutting tool 100B is "preparation position" are displayed, and the measurement result of measurement sensor 10 of cutting tool 100B is not displayed.

Further, when the position of cutting tool 100C is the stop position, wireless communication unit 30 of cutting tool 100C is in the non-reporting state, and measurement sensor 10 of cutting tool 100C is in the non-measurement state. Therefore, the measurement information from cutting tool 100C is not transmitted, and on the screen G, for example, the ID of cutting tool 100C is displayed, and the position of cutting tool 100C and the measurement result of measurement sensor 10 of cutting tool 100C are not displayed.

In a system capable of monitoring a state of a cutting tool, a technique capable of realizing a more excellent function is desired.

In contrast, in cutting tool 100 according to the embodiment of the present disclosure, cutting insert 1 has a cutting edge. Holder 2 holds cutting insert 1. Wireless communication unit 30 transmits information based on a measurement result of a sensor attached to cutting tool 100. Acceleration sensor 50 is disposed at holder 2. Control unit 40 performs first activation control for controlling activation of wireless communication unit 30 based on the measurement result of acceleration sensor 50.

For example, in order to suppress consumption of electric power necessary for wireless transmission of measurement information that is information based on a measurement result, a technique of activating wireless communication unit 30 at a timing of starting machining is desired. On the other hand, in order to control the activation of wireless communication unit 30 at the timing of starting the machining, an input operation by an operator, installation of an external device for detecting the timing of starting the machining, or the like is required.

In contrast, with the above-described configuration, the state of cutting tool 100 can be determined using acceleration sensor 50 mounted on cutting tool 100. Accordingly, since it is possible to grasp the timing suitable for activation of wireless communication unit 30 in cutting tool 100, it is possible to perform activation of wireless communication unit 30 at an appropriate timing without requiring an input operation by an operator or installation of an external device.

In addition, by performing activation of wireless communication unit 30 at an appropriate timing, it is possible to suppress consumption of power necessary for wireless transmission of measurement information and to suppress an increase in wireless traffic.

Therefore, in cutting tool 100 according to the embodiment of the present disclosure, it is possible to realize more excellent functions in a system capable of monitoring the state of cutting tool 100.

In addition, cutting tool 100 according to the embodiment of the present disclosure includes a plurality of acceleration sensors 50 each being acceleration sensor 50 and each configured to measure an acceleration in a single direction, or a single acceleration sensor 50 being acceleration sensor 50 and configured to measure accelerations in a plurality of directions.

For example, in a system in which cutting tool 100 is attached to turret 52 of machining equipment 120 and cutting tool 100 used for machining is automatically replaced by rotating turret 52 for each machining process, gravitational acceleration in the vertical direction that cutting tool 100 experiences has the same value at two locations that are line-symmetric with respect to a straight line passing through the center of turret 52 and extending in the vertical direction.

In contrast, with the configuration as described above, it is possible to measure gravitational acceleration in a plurality of directions, and thus it is possible to more accurately determine the position of cutting tool 100 and to perform activation of wireless communication unit 30 at more appropriate timing.

In addition, in cutting tool 100 according to the embodiment of the present disclosure, control unit 40 is configured to determine the position of cutting tool 100, and performs the first activation control of which details correspond to the determined position.

With such a configuration, for example, since the timing at which cutting tool 100 reaches the machining position can be grasped, the activation of wireless communication unit 30 in cutting tool 100 can be performed at a more appropriate timing.

In addition, in cutting tool 100 according to the embodiment of the present disclosure, the position includes a machining position in which machining with cutting tool 100 is performed, a stop position in which machining with cutting tool 100 is not performed, and a preparation position between the machining position and the stop position. Control unit 40 is configured to activate wireless communication unit 30 as the first control in a case where cutting tool 100 is in the preparation position.

With such a configuration, before starting machining by cutting tool 100, it is possible to secure a time for establishing communication connection between cutting tool 100 and management device 200 that is a transmission destination of measurement information. Therefore, it is possible for management device 200 to more reliably acquire the measurement information at the timing of starting the machining.

Further, cutting tool 100 according to the embodiment of the present disclosure further includes measurement sensor 10 of a type different from acceleration sensor 50. Wireless communication unit 30 is configured to transmit information based on a measurement result of measurement sensor 10. Control unit 40 is configured to further perform a second activation control of controlling activation of measurement sensor 10 based on the measurement result of acceleration sensor 50.

In this manner, by performing the second activation control in addition to the first activation control, it is possible to further suppress power consumption.

In addition, in tool system 300 according to the embodiment of the present disclosure, each of first cutting tool 100 and second cutting tool 100 includes cutting insert 1 having a cutting edge, holder 2 to hold cutting insert 1, wireless communication unit 30 configured to transmit measurement information based on a measurement result of a sensor attached to corresponding cutting tool 100, acceleration sensor 50 disposed at holder 2, and control unit 40 configured to perform activation control of controlling activation of wireless communication unit 30 based on a measurement result of acceleration sensor 50. In addition, control unit 40 of first cutting tool 100 and control unit 40 of second cutting tool 100 are configured to perform the activation control at a timing of a change in the positions of first cutting tool 100 and second cutting tool 100 with respect to workpiece P, details of the activation control performed by control unit 40 of first cutting tool 100 and details of the activation control performed by control unit 40 of second cutting tool 100 being different from each other.

For example, in order to suppress consumption of power necessary for wireless transmission of measurement information, a technique of activating wireless communication unit 30 at a timing of starting machining is desired. On the other hand, in order to control the activation of wireless communication unit 30 at the timing of starting the machining, an input operation by an operator, installation of an external device for detecting the timing of starting the machining, or the like is required.

In contrast, with the above-described configuration, the state of cutting tool 100 can be determined using acceleration sensor 50 mounted on cutting tool 100. Accordingly, since it is possible to grasp the timing suitable for activation of wireless communication unit 30 in cutting tool 100, it is possible to perform activation of wireless communication unit 30 at an appropriate timing without requiring an input operation by an operator or installation of an external device.

In addition, by performing activation of wireless communication unit 30 at an appropriate timing, it is possible to suppress consumption of power necessary for wireless transmission of measurement information and to suppress an increase in wireless traffic particularly effectively in tool system 300 including a plurality of cutting tools 100.

Further, according to the above-described configuration, for example, at the timing at which machining is performed by the first cutting tool, the wireless communication unit in the first cutting tool can be activated, and the wireless communication unit in the second cutting tool can be stopped. That is, the control unit in each cutting tool can perform the first activation control with appropriate details according to the state of each cutting tool.

Therefore, in tool system 300 according to the embodiment of the present disclosure, a more excellent function can be realized in a system capable of monitoring the state of cutting tool 100.

In tool system 300 according to the embodiment of the present disclosure, control unit 40 determines the position of cutting tool 100 with respect to workpiece P, and creates position information indicating the determined result. Wireless communication unit 30 transmits measurement information including the position information created by control unit 40. Management device 200 displays the detail based on the position information included in the measurement information received from wireless communication unit 30.

With such a configuration, in management device 200, since the position of each cutting tool 100 can be further grasped in addition to the measurement result of the sensor, it is possible to easily confirm whether or not the measurement of the sensor in cutting tool 100 during machining is appropriately performed.

A communication control method according to the embodiment of the present disclosure is a communication control method in tool system 300 including first cutting tool 100 for turning and second cutting tool 100 for turning. Each of first cutting tool 100 and second cutting tool 100 includes cutting insert 1 having a cutting edge, holder 2 holding cutting insert 1, wireless communication unit 30 configured to transmit information based on a measurement result of a sensor attached to corresponding cutting tool 100 among first cutting tool 100 and second cutting tool 100, acceleration sensor 50 disposed at holder 2, and control unit 40 configured to perform activation control of controlling activation of wireless communication unit 30, based on a measurement result of acceleration sensor 50. In this communication control method, first, control unit 40 of first cutting tool 100 acquires the measurement result of corresponding acceleration sensor 50. Next, control unit 40 of second cutting tool 100 acquires the measurement result of corresponding acceleration sensor 50. Then, control unit 40 in first cutting tool 100 and control unit 40 in second cutting tool 100 perform activation control, details of the activation control performed by control unit 40 of first cutting tool 100 and details of the activation control performed by control unit 40 of second cutting tool 100 being different from each other.

For example, in order to suppress consumption of power necessary for wireless transmission of measurement information, a technique of activating wireless communication unit 30 at a timing of starting machining is desired. On the other hand, in order to control the activation of wireless communication unit 30 at the timing of starting the machining, an input operation by an operator, installation of an external device for detecting the timing of starting the machining, or the like is required.

In contrast, according to the method described above, the state of cutting tool 100 can be determined by using acceleration sensor 50 mounted on cutting tool 100. Accordingly, since it is possible to grasp the timing suitable for activation of wireless communication unit 30 in cutting tool 100, it is possible to perform activation of wireless communication unit 30 at an appropriate timing without requiring an input operation by an operator or installation of an external device.

In addition, by performing activation of wireless communication unit 30 at an appropriate timing, it is possible to suppress consumption of power necessary for wireless transmission of measurement information and to suppress an increase in wireless traffic particularly effectively in tool system 300 including a plurality of cutting tools 100.

Further, according to the above-described method, for example, at the timing at which machining is performed by the first cutting tool, the wireless communication unit in the first cutting tool can be activated, and the wireless communication unit in the second cutting tool can be stopped. That is, the control unit in each cutting tool can perform the first activation control with appropriate details according to the state of each cutting tool.

Therefore, in the communication control method according to the embodiment of the present disclosure, it is possible to realize more excellent functions in a system capable of monitoring the state of cutting tool 100.

The above-described embodiments are to be considered in all respects as illustrative and not restrictive. The scope of the present invention is defined not by the above description but by the claims, and is intended to include meanings equivalent to the claims and all modifications within the scope.

The foregoing description includes the following additional features.

Supplementary Note 1

A cutting tool for turning, comprising:
a cutting insert having a cutting edge;
a holder to hold the cutting insert;
a wireless communication unit configured to transmit information based on a measurement result of a sensor attached to the cutting tool;
an acceleration sensor disposed at the holder; and
a control unit configured to perform first control of controlling activation of the wireless communication unit, based on a measurement result of the acceleration sensor, and
wherein the acceleration sensor is configured to measure gravitational acceleration that the cutting tool experiences, and
wherein the gravitational acceleration changes according to a position of the cutting tool.

Supplementary Note 2

A tool system comprising:
a first cutting tool for turning; and
a second cutting tool for turning,
wherein each of the first cutting tool and the second cutting tool includes a cutting insert having a cutting edge, a holder to hold the cutting insert, a wireless communication unit configured to transmit measurement information based on a measurement result of a sensor attached to a corresponding cutting tool among the first cutting tool and the second cutting tool, an acceleration sensor disposed at the holder, and a control unit configured to perform activation control of controlling activation of the wireless communication unit, based on a measurement result of the acceleration sensor, and
wherein the first cutting tool and the second cutting tool are attached to a turret of machining equipment, the turret rotates for each machining process, and the positions of the first cutting tool and the second cutting tool change due to rotation of the turret.

REFERENCE SIGNS LIST 1 cutting insert
3A, 3B fixing member
2 holder
10 measurement sensor
20 data generation unit
30 wireless communication unit
40 control unit
50 acceleration sensor
51 motor holder
52 turret
53 tool holder
60 battery
70 storage unit
100 cutting tool
110 sensor module
120 machining equipment
200 management device
201 wireless base unit
300 tool system

What is claimed is:

1. A cutting tool for turning, comprising:
a cutting insert having a cutting edge;
a holder to hold the cutting insert;
a wireless transmitter configured to transmit information based on a measurement result of a sensor attached to the holder;
an acceleration sensor disposed at the holder; and
a processor configured to perform first control of controlling activation of the wireless transmitter, based on a measurement result of the acceleration sensor,
wherein the acceleration sensor is configured to determine a state of the cutting tool with respect to a workpiece, and
wherein the first control includes selectively activating the wireless transmitter based on the state of the cutting tool with respect to the workpiece.

2. The cutting tool according to claim 1, wherein the cutting tool includes a plurality of acceleration sensors each being the acceleration sensor and each configured to measure an acceleration in a single direction, or a single acceleration sensor being the acceleration sensor and configured to measure accelerations in a plurality of directions.

3. The cutting tool according to claim 1, wherein the processor is configured to determine a position of the cutting tool with respect to the workpiece, and perform the first control of which details correspond to the determined position.

4. The cutting tool according to claim 3, wherein the position includes a machining position in which machining with the cutting tool is performed, a stop position in which machining with the cutting tool is not performed, and a preparation position between the machining position and the stop position, and wherein the processor is configured to activate the wireless transmitter as the first control in a case where the cutting tool is in the preparation position with respect to the workpiece.

5. The cutting tool according to claim 1, further comprising:
a measurement sensor of a type different from the acceleration sensor,
wherein the wireless transmitter is configured to transmit information based on a measurement result of the measurement sensor, and
wherein the processor is configured to further perform second control of controlling activation of the measurement sensor, based on the measurement result of the acceleration sensor.

6. A tool system comprising:
a first cutting tool for turning; and
a second cutting tool for turning,
wherein each of the first cutting tool and the second cutting tool includes a cutting insert having a cutting edge, a holder to hold the cutting insert, a wireless transmitter configured to transmit measurement information based on a measurement result of a sensor attached to the holder, an acceleration sensor disposed at the holder, and a processor configured to perform activation control of controlling activation of the wireless transmitter, based on a measurement result of the acceleration sensor,
wherein the processor of the first cutting tool and the processor of the second cutting tool are configured to perform the activation control at a timing of a change in the positions of the first cutting tool and the second cutting tool with respect to a workpiece, details of the activation control performed by the processor of the first cutting tool and details of the activation control performed by the processor of the second cutting tool being different from each other,
wherein when the wireless transmitter of the first cutting tool is active, the wireless transmitter of the second cutting tool is inactive, and
wherein when the wireless transmitter of the second cutting tool is active, the wireless transmitter of the first cutting tool is inactive.

7. The tool system according to claim 6, further comprising:
a management device,
wherein the processor is configured to determine a position of the first cutting tool or the second cutting tool with respect to the workpiece and create position information indicating a determined result,
wherein the wireless transmitter is configured to transmit the measurement information including the position information created by the processor, and
wherein the management device is configured to display details based on the position information included in the measurement information received from the wireless transmitter.

8. A communication control method in a tool system including a first cutting tool for turning and a second cutting tool for turning,
each of the first cutting tool and the second cutting tool including a cutting insert having a cutting edge, a holder to hold the cutting insert, a wireless transmitter configured to transmit information based on a measurement result of a sensor attached to the holder, an acceleration sensor disposed at the holder, and a processor configured to perform activation control of controlling activation of the wireless transmitter, based on a measurement result of the acceleration sensor, the communication control method comprising:
acquiring, by the processor of the first cutting tool, the measurement result of the corresponding acceleration sensor;
acquiring, by the processor of the second cutting tool, the measurement result of the corresponding acceleration sensor; and
performing, by the processor of the first cutting tool and the processor of the second cutting tool, the activation control, details of the activation control performed by the processor of the first cutting tool and details of the activation control performed by the processor of the second cutting tool being different from each other,
wherein when the wireless transmitter of the first cutting tool is active, the wireless transmitter of the second cutting tool is inactive, and
wherein when the wireless transmitter of the second cutting tool is active, the wireless transmitter of the first cutting tool is inactive.

* * * * *